US012709099B2

(12) United States Patent
Aichi et al.

(10) Patent No.: US 12,709,099 B2
(45) Date of Patent: Aug. 18, 2026

(54) PRINTING APPARATUS, A METHOD OF CONTROLLING A PRINTING APPARATUS, AND A STORAGE MEDIUM IN WHICH A CONTROL UNIT CAUSES A DISCHARGE UNIT TO DISCHARGE AN AMOUNT OF CLEANING LIQUID

(71) Applicant: CANON KABUSHIKI KAISHA, Tokyo (JP)

(72) Inventors: Akiko Aichi, Tokyo (JP); Toshimitsu Danzuka, Tokyo (JP); Rie Takekoshi, Kanagawa (JP); Akihiro Tomida, Kanagawa (JP); Keita Ishimi, Kanagawa (JP); Hiroto Kango, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 18/513,078

(22) Filed: Nov. 17, 2023

(65) Prior Publication Data

US 2024/0198678 A1 Jun. 20, 2024

(30) Foreign Application Priority Data

Dec. 20, 2022 (JP) ................................ 2022-203711

(51) Int. Cl.
*B41J 2/165* (2006.01)
*B41J 2/045* (2006.01)

(52) U.S. Cl.
CPC ......... *B41J 2/16505* (2013.01); *B41J 2/0454* (2013.01); *B41J 2/04566* (2013.01);
(Continued)

(58) Field of Classification Search
CPC ................ B41J 2/16505; B41J 2/04566; B41J 2/16532; B41J 2/16552
See application file for complete search history.

(56) References Cited

U.S. PATENT DOCUMENTS 7,287,825 B2 10/2007 Furuichi et al. ......... B41J 2/165
7,290,858 B2 11/2007 Furuichi et al. ......... B41J 2/205
(Continued)

FOREIGN PATENT DOCUMENTS

JP 2017-128010 7/2017

OTHER PUBLICATIONS

U.S. Appl. No. 18/512,995, filed Nov. 17, 2023.
(Continued)

*Primary Examiner* — Sharon Polk
(74) *Attorney, Agent, or Firm* — Venable LLP

(57) ABSTRACT

A printing apparatus includes a cap configured to cap a print head having an ejection orifice from which ink is ejected, a supply unit configured to supply cleaning liquid into the cap, a discharge unit configured to discharge the cleaning liquid from the cap, and a control unit configured to execute a discharge operation to cause the discharge unit to discharge an amount of the cleaning liquid less than a supply amount of the cleaning liquid supplied into the cap by the supply unit. In a case when an ink amount discharged from the ejection orifice is a first amount, the control unit does not execute the discharge operation, and, in a case when the ink amount discharged from the ejection orifice is a second amount that is greater than the first amount, the control unit executes the discharge operation.

16 Claims, 17 Drawing Sheets

(52) U.S. Cl.
CPC ....... *B41J 2/16508* (2013.01); *B41J 2/16532* (2013.01); *B41J 2/16552* (2013.01)

(56) References Cited

U.S. PATENT DOCUMENTS

| | | | | |
|---|---|---|---|---|
| 8,882,232 | B2 | 11/2014 | Ibe et al. | B41J 29/393 |
| 9,114,651 | B2 | 8/2015 | Kato et al. | B41J 29/393 |
| 9,162,462 | B2 | 10/2015 | Komatsu et al. | B41J 2/165 |
| 9,561,658 | B2 | 2/2017 | Danzuka et al. | B41J 29/393 |
| 9,707,763 | B2 | 7/2017 | Nakagawa et al. | B41J 2/165 |
| 9,862,195 | B2 | 1/2018 | Genta et al. | B41J 2/165 |
| 10,369,797 | B2 | 8/2019 | Genta et al. | B41J 2/165 |
| 11,192,373 | B2 * | 12/2021 | Saito | B41J 2/16588 |
| 11,247,471 | B2 | 2/2022 | Narumi et al. | B41J 2/165 |
| 11,400,719 | B2 | 8/2022 | Kobayashi et al. | B41J 2/1652 |
| 11,772,380 | B2 | 10/2023 | Narumi et al. | B41J 2/165 |
| 2020/0130355 | A1 * | 4/2020 | Kanazawa | B41J 2/16532 |
| 2021/0394516 | A1 * | 12/2021 | Takahashi | B41J 2/16523 |
| 2022/0305792 | A1 | 9/2022 | Ishii et al. | B41J 2/165 |
| 2022/0324233 | A1 | 10/2022 | Uetsuki et al. | B41J 2/165 |
| 2022/0388321 | A1 | 12/2022 | Takekoshi et al. | B41J 25/00 |
| 2024/0001678 | A1 | 1/2024 | Tomida et al. | B41J 2/165 |
| 2024/0010002 | A1 | 1/2024 | Takekoshi et al. | B41J 2/175 |

OTHER PUBLICATIONS

U.S. Appl. No. 18/535,252, filed Dec. 11, 2023.
U.S. Appl. No. 18/535,834, filed Dec. 11, 2023.
U.S. Appl. No. 18/399,572, filed Dec. 28, 2023.

* cited by examiner

| PARAMETER SET | FIRST SET | SECOND SET | THIRD SET |
|---|---|---|---|
| FIRST SUPPLY AMOUNT | 0 mℓ | 1.5 mℓ | 2.0 mℓ |
| FIRST DISCHARGE AMOUNT | 2.0 mℓ | 1.5 mℓ | 2.0 mℓ |
| FIRST NUMBER OF ITERATIONS | 1 | 2 | 3 |

FIG.10

| PARAMETER | PARAMETER A | PARAMETER B | PARAMETER C |
|---|---|---|---|
| SECOND SUPPLY AMOUNT | 2.6 mℓ | 3.2 mℓ | 3.7 mℓ |

FIG.11

| | | HUMIDITY [%RH] | | | |
|---|---|---|---|---|---|
| | | LESS THAN 20%RH | 20%RH OR MORE, LESS THAN 50%RH | 50%RH OR MORE, LESS THAN 80%RH | 80%RH OR MORE |
| TEMPERATURE [°C] | 35C° OR MORE | C | C | B | B |
| | 29C° OR MORE, LESS THAN 35 °C | C | B | B | A |
| | 15C° OR MORE, LESS THAN 29 °C | C | B | A | A |
| | LESS THAN 15 °C | C | B | A | A |

FIG.12

| CLEANING SEQUENCE OF RECOVERY PROCESSING APPARATUS EXECUTION DETERMINATION TIMING | PRIORITY | CONDITIONS •IN-CAP INK COUNT •HUMIDITY (ALL HUMIDITIES IN A CASE WHERE NOTHING IS WRITTEN) | PARAMETER SET | UPDATE OF IN-CAP INK COUNT AFTER EXECUTION OF CLEANING | UPDATE OF CLEANING TIMER AFTER EXECUTION OF CLEANING |
|---|---|---|---|---|---|
| AFTER SUCTION RECOVERY | FIRST PRIORITY | | THIRD SET | RESET TO 0 | RESET TO 0 |
| IN A CASE WHERE CLEANING TIMER EXPIRES | FIRST PRIORITY | COUNT IS 6.0E+8 OR MORE | THIRD SET | RESET TO 0 | RESET TO 0 |
| | SECOND PRIORITY | COUNT IS 4.0E+8 OR MORE | SECOND SET | RESET TO 0 | RESET TO 0 |
| | THIRD PRIORITY | OTHER THAN ABOVE | FIRST SET | -1.00E+8 | RESET TO 0 |
| IN A CASE WHERE PRINT OPERATION IS FINISHED | FIRST PRIORITY | COUNT IS 8.0E+8 OR MORE | THIRD SET | RESET TO 0 | RESET TO 0 |
| | SECOND PRIORITY | COUNT IS 6.0E+8 OR MORE, OR HUMIDITY IS LESS THAN 20%RH | FIRST SET | -1.00E+8 | CONTINUES |
| | THIRD PRIORITY | OTHER THAN ABOVE | NO EXECUTION | NO EXECUTION | CONTINUES |
| IN A CASE WHERE POWER IS TURNED OFF | FIRST PRIORITY | COUNT IS 6.0E+8 OR MORE | THIRD SET | RESET TO 0 | RESET TO 0 |
| | SECOND PRIORITY | COUNT IS 1.0E+7 OR MORE | SECOND SET | RESET TO 0 | RESET TO 0 |
| | THIRD PRIORITY | COUNT IS 0 | NO EXECUTION | NO EXECUTION | CONTINUES |
| | FOURTH PRIORITY | OTHER THAN ABOVE | FIRST SET | CONTINUES | CONTINUES |

FIG.14

| | | HUMIDITY [%RH] | | | |
|---|---|---|---|---|---|
| | | LESS THAN 20%RH | 20%RH OR MORE, LESS THAN 50%RH | 50%RH OR MORE, LESS THAN 80%RH | 80%RH OR MORE |
| TEMPERATURE [°C] | 35C° OR MORE | C | C | B | B |
| | 29C° OR MORE, LESS THAN 35 °C | C | B | B | A |
| | 15C° OR MORE, LESS THAN 29 °C | C | B | A | A |
| | LESS THAN 15 °C | C | B | A | A |

FIG.16A

| | EXPIRATION VALUE OF CLEANING TIMER [Hour] |
|---|---|
| A | 6.0 |
| B | 4.5 |
| C | 3.0 |

FIG.16B

PRINTING APPARATUS, A METHOD OF CONTROLLING A PRINTING APPARATUS, AND A STORAGE MEDIUM IN WHICH A CONTROL UNIT CAUSES A DISCHARGE UNIT TO DISCHARGE AN AMOUNT OF CLEANING LIQUID

CLAIM TO PRIORITY APPLICATION

This application claims the benefit of Japanese Patent Application No. 2022-203711, filed Dec. 20, 2022, which is hereby incorporated by reference herein in its entirety.

BACKGROUND OF THE DISCLOSURE

Field of the Disclosure

The present disclosure relates to a printing apparatus that ejects liquid such as an ink to form images.

Description of the Related Art

In an inkjet printing apparatus (herein after, referred to as "printing apparatus"), the state in which the print head can perform favorable ink ejection is maintained by operating a pump with the ejection orifice surface of the print head covered with a cap and sucking ink around the ejection orifice surface from the cap side. The ink sucked from around the ejection orifice surface passes through a flow path and is stored in a specified tank.

Here, in a case wherein the ink remaining in the cap or the flow path is solidified, there is a possibility that the ink cannot flow smoothly through the flow path, and that the ink cannot be sucked. Hence, a printing apparatus provided with a mechanism for causing cleaning liquid to flow through the cap, the flow path, and the pump to reduce contaminations is known.

The printing apparatus disclosed in Japanese Patent Laid-Open No. 2017-128010 has a supply path for supplying a cleaning liquid into the cap. After a print operation, the cap is filled with cleaning liquid to make a state in which the cap is closed with the cleaning liquid in contact with the ejection orifices of the print head. Then, a suction operation is performed with the cap open or with an atmospheric vent valve of the cap open, and the ink attached to the ejection orifice surface of the print head and the inside of the cap is mixed with cleaning liquid and discharged to the outside.

To prevent the ink remaining in the cap and the flow path from solidifying, a predetermined amount or more of cleaning liquid needs to be always stored in the cap. However, maintaining the state in which a great amount of cleaning liquid is filled in the cap increases the consumption of the cleaning liquid, and accordingly, increases the cost necessary for the cleaning liquid. With the background above, a technique that reduces the consumption of cleaning liquid is required.

SUMMARY OF THE DISCLOSURE

A printing apparatus according to the present disclosure includes: a cap configured to cap a print head having an ejection orifice from which an liquid is ejected, a supply unit configured to supply a cleaning liquid into the cap, a discharge unit configured to discharge the liquid from the cap, and a control unit configured to execute a discharge operation to cause the discharge unit to discharge an amount of the liquid smaller than a supply amount of the cleaning liquid supplied into the cap by the supply unit, in which, in a case when a liquid amount discharged from the ejection orifice is a first amount, the control unit executes the discharge operation in a manner different from a manner in a case when the liquid amount is a second amount which is larger than the first amount.

Further features of the present disclosure will become apparent from the following description of exemplary embodiments with reference to the attached drawings.

BRIEF DESCRIPTION OF THE DRAWINGS

FIG. 10 is a table showing parameters in the cleaning sequence of the recovery processing unit;

FIG. 11 is a table showing a parameter in the cleaning sequence of the recovery processing unit;

FIG. 12 is a temperature-humidity table used for parameter selection in the cleaning sequence of the recovery processing unit;

FIG. 14 is a table showing execution determination timings of the cleaning sequence of the recovery processing unit;

FIG. 16A is a temperature-humidity table used for parameter selection in the cleaning sequence of the recovery processing unit;

FIG. 16B is a table showing cleaning-timer expiration values in the cleaning sequence of the recovery processing unit.

DESCRIPTION OF THE EMBODIMENTS

Figure 1:
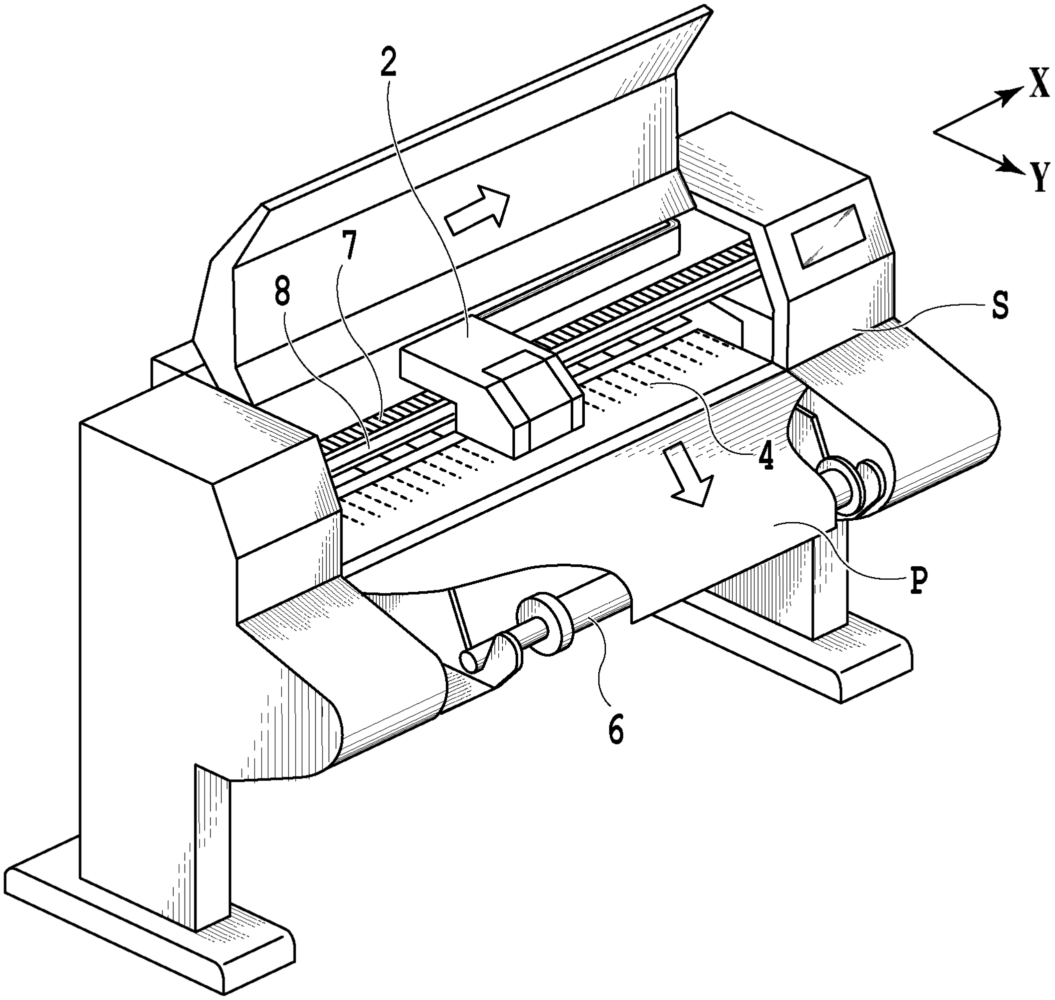
FIG. 1 is a schematic configuration diagram of a printing apparatus.

Hereafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts is denoted by a reference numeral starting with S.

In this specification, the term “printing” denotes not only forming meaningful information such as characters and figures but also forming meaningless information. The term “printing” herein broadly denotes forming images, designs, patterns, and the like, on print media and processing media whether the resultant is visible in a way that humans can perceive it visually. The term “print media” herein not only denotes paper that is used in general printing apparatuses but broadly denotes cloth, plastic films, metal plates, glass, ceramics, wood, leather, and the like that can receive ink. In addition, the term “ink” (also referred to as “liquid”) should be broadly interpreted in a manner the same as or similar to the definition of the term “printing” as above. Hence, the term “ink” denotes liquids that are provided onto print media to form images, designs, patterns, and the like, or processing print media and also denotes liquids that are provided to treat ink (for example, to solidify or to insolubilize coloring materials in the ink to be provided onto print media).

First Embodiment

Herein after, a printing apparatus according to a first embodiment of the present disclosure will be described in detail with reference to the attached drawings.

Configuration of Apparatus

FIG. 1 is a schematic configuration diagram of the printing apparatus according to the present embodiment. This printing apparatus is a so-called serial scanning printer, which prints images by moving a print head in the X direction (scanning direction) orthogonal to the Y direction (conveyance direction) of the print medium P.

The configuration of the printing apparatus 1 and an outline of its operation in printing are described with reference to FIG. 1. First, a conveyance motor (not illustrated) drives a conveying roller via gears, and a spool 6 driven by the conveying roller and holding the print medium P conveys the print medium P in the Y direction. At a predetermined conveyance position, a carriage unit 2, driven by a carriage motor (not illustrated), performs reciprocal scanning (to reciprocate) along a guide shaft 8 extending in the X direction. In the course of this scanning, the print head, described later, attachable to the carriage unit 2 performs ejection operation through ejection orifices (nozzles) 304 at timings based on position signals obtained by a linear encoder 7, so that a certain band width corresponding to the arrangement area of the ejection orifices 304 is printed. The present embodiment is based on a configuration in which scanning is performed at a scanning speed of 40 inches per second, and eject operation is performed at a resolution of 1200 dpi (1/1200 inches). After that, the print medium P is conveyed, and printing is performed on the next band width.

The fed print medium P is conveyed by being pinched between a paper feeding roller and a pinch roller, and led to a printing position on a platen 4 (the scanning area of the print head). Since the ejection orifice surface (nozzle surface) of the print head is, in general, capped in the standby state, the cap is removed before printing to place the print head or the carriage unit 2 into a scanning ready state. Then, after data for one scanning operation is accumulated in a buffer, the carriage motor causes the carriage unit 2 to perform scanning, and printing is thus performed as described above. Here, the printing apparatus 1 is capable of so-called multi-pass printing in which an image is printed onto a unit area (1/n of a band) on the print medium P by a plurality of (n) scanning operations of the print head.

The printing apparatus 1 has a temperature-humidity sensor S, which is capable of measuring the temperature and humidity of the environment of the printing apparatus 1. Temperature measurement and humidity measurement are executed every ten minutes, and the measurement results are recorded.

Figure 2A:
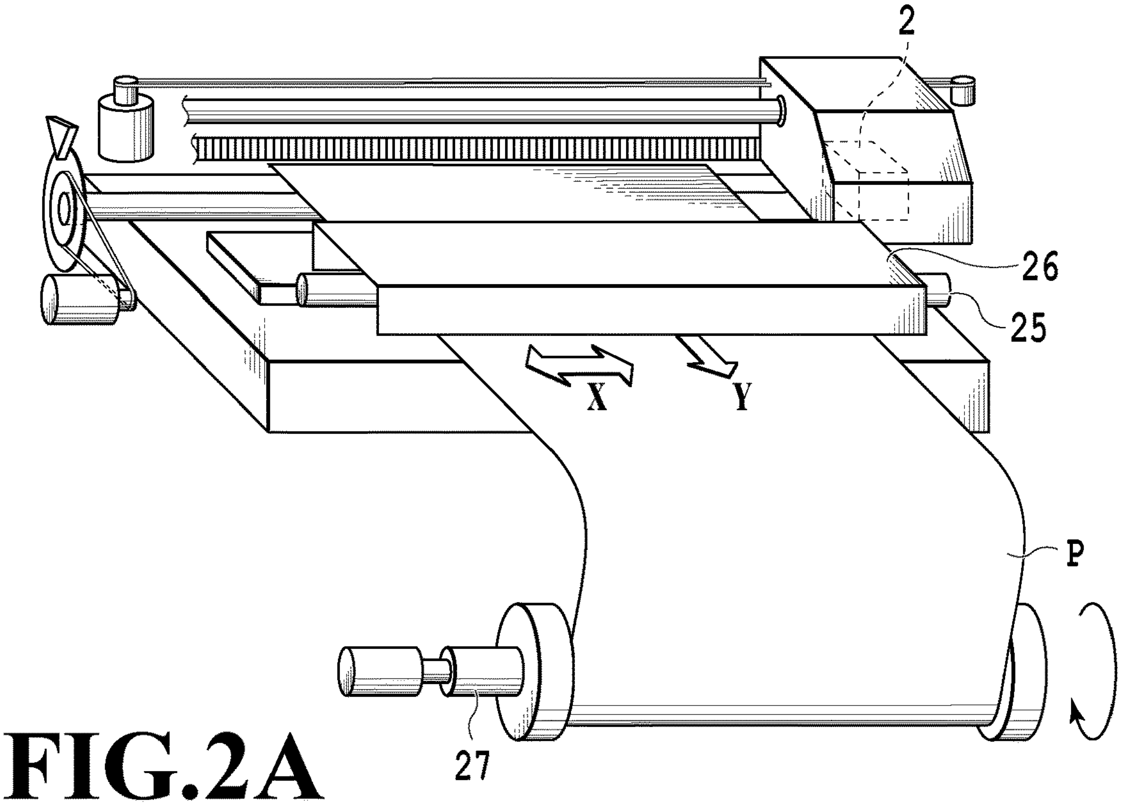
FIG. 2A is a schematic configuration diagram of the printing apparatus and a heater.
Figure 2B:
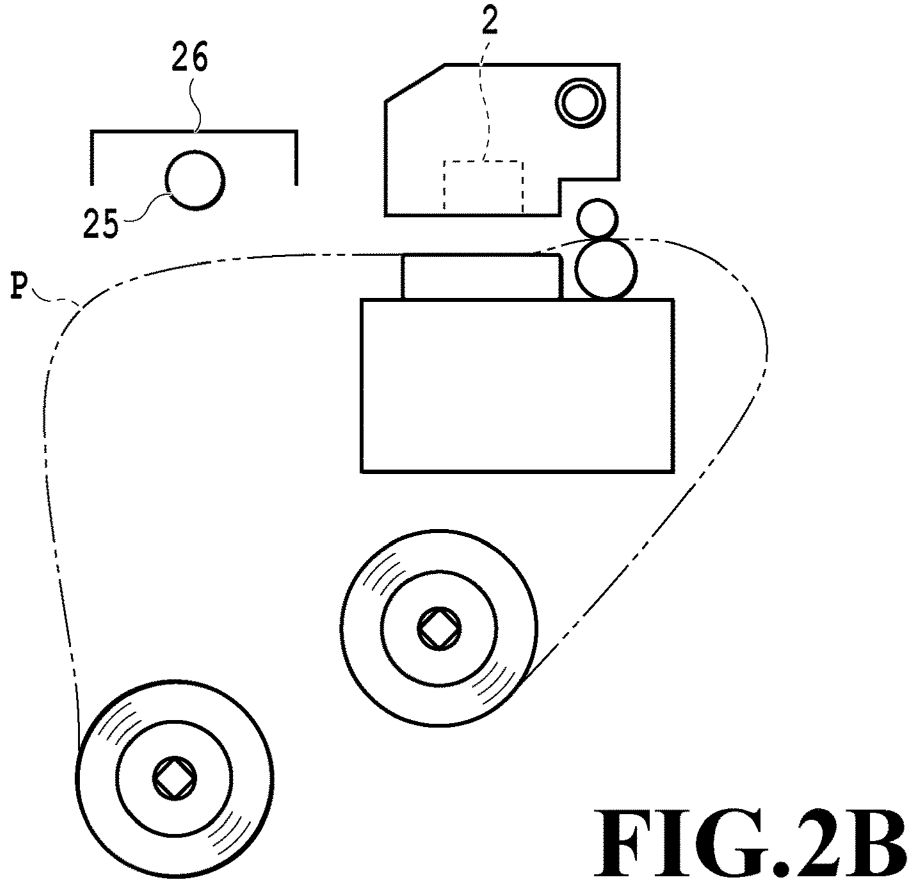
FIG. 2B is a cross-sectional side view of the printing apparatus and the heater illustrated in FIG. 2A.

As illustrated in FIGS. 2A and 2B, a heater 25 supported by a frame (not illustrated) is located at a position downstream in the Y direction of the position where the print head performs reciprocal scanning in the X direction. Heat of this heater 25 dries the ink in a liquid state ejected onto the print medium P. The heater 25 is covered with a heater cover 26, which has a function of efficiently radiating heat of the heater 25 to the print medium P and a function of protecting the heater 25. This heater 25 and the heater cover 26 compose a heating unit 56. Note that specific examples of the heater 25 include a sheathed heater and a halogen heater. The heater 25 is for fixing the ink described later in the present embodiment, and hence, the heater is not necessary depending on the type of the ink.

Figure 3:
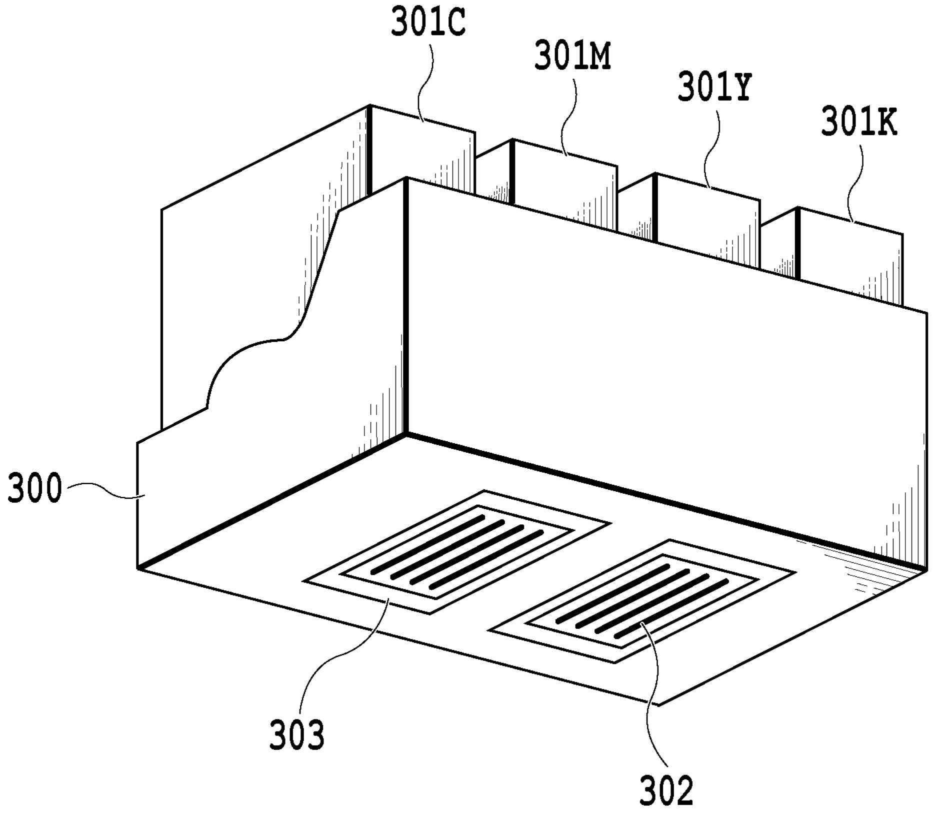
FIG. 3 is a schematic diagram of a print head.

FIG. 3 is a schematic diagram of the print head according to the present embodiment viewed from the direction in which the print head 300 ejects the ink (from below). The print head 300 has an ejection orifice surface 303 having a plurality of ejection orifice rows (nozzle rows) 302 in each of which a plurality of ejection orifices 304 for ejecting the ink are arranged. The ejection orifice rows 302 are arranged such that the ink of different tones (including colors and densities) can be ejected along the carriage movement direction. For example, the ejection orifice rows 302 capable of ejecting the ink of cyan (C), magenta (M), yellow (Y), and black (K) are arranged side by side in the carriage movement direction. Note that the order of arrangement of the ejection orifice rows 302 is not limited to this example.

These ejection orifice rows 302 each includes 1280 ejection orifices 304, each of which ejects the corresponding ink, arranged in the Y direction (arrangement direction) at a density of 1200 dpi. Note that the amount of the ink ejected at one time from one ejection orifice 304 in the present embodiment is approximately 4.5 μl. The outermost surface of the ejection orifice surface 303 is composed of a water repellent film. The contact angle of the ink on the water repellent film is eighty degrees or more and one hundred degrees or less. Here, the contact angle denotes the contact angle (dynamic receding contact angle) of an ink droplet on the surface of a material. Water repellency denotes a property in which, in a case wherein a water droplet comes into contact with a material, the water droplet does not spread and does not wet the material in which the water droplet is contacted. Whether the water repellency of a material is high or low can be judged by measuring the contact angle (dynamic receding contact angle) of the ink droplet on the surface of the material.

The ink is supplied to the ejection orifices 304 through ink flow paths inside the print head 300 from ink joints 301 (not illustrated) connected to ink tanks (not illustrated) through supply tubes. The print head 300 of the present embodiment is an inkjet print head that uses thermal energy to eject the ink and, hence, includes a plurality of electrothermal converters for generating thermal energy.

Specifically, in the print head 300, pulse signals applied to the electrothermal converter generate thermal energy. This thermal energy causes film boiling of the ink in an ink foaming chamber (not illustrated), and the pressure of the foamed bubble of the film boiling is used to eject the ink through the ejection orifice 304. Note that the ink ejection method is not limited to this example and may be a method with piezoelectric elements. In addition, the carriage may be provided with a plurality of print heads 300 each capable of ejecting one color of the ink or a plurality of colors of the ink, or the carriage may be provided with one print head 300 capable of ejecting a plurality of colors of ink.

The ink is supplied from the ink tanks mounted in the main body or an external unit through the supply tubes to the print head 300 via the carriage unit 2. The ink may be supplied from the ink tanks to the print head 300 by using a pressurizing unit (not illustrated). The ink may be supplied by capping the ejection orifice surface 303 of the print head 300 with a cap of a recovery unit described later and applying a negative pressure to the inside of the cap to perform sucking by using a suction pump described later.

Figure 4:
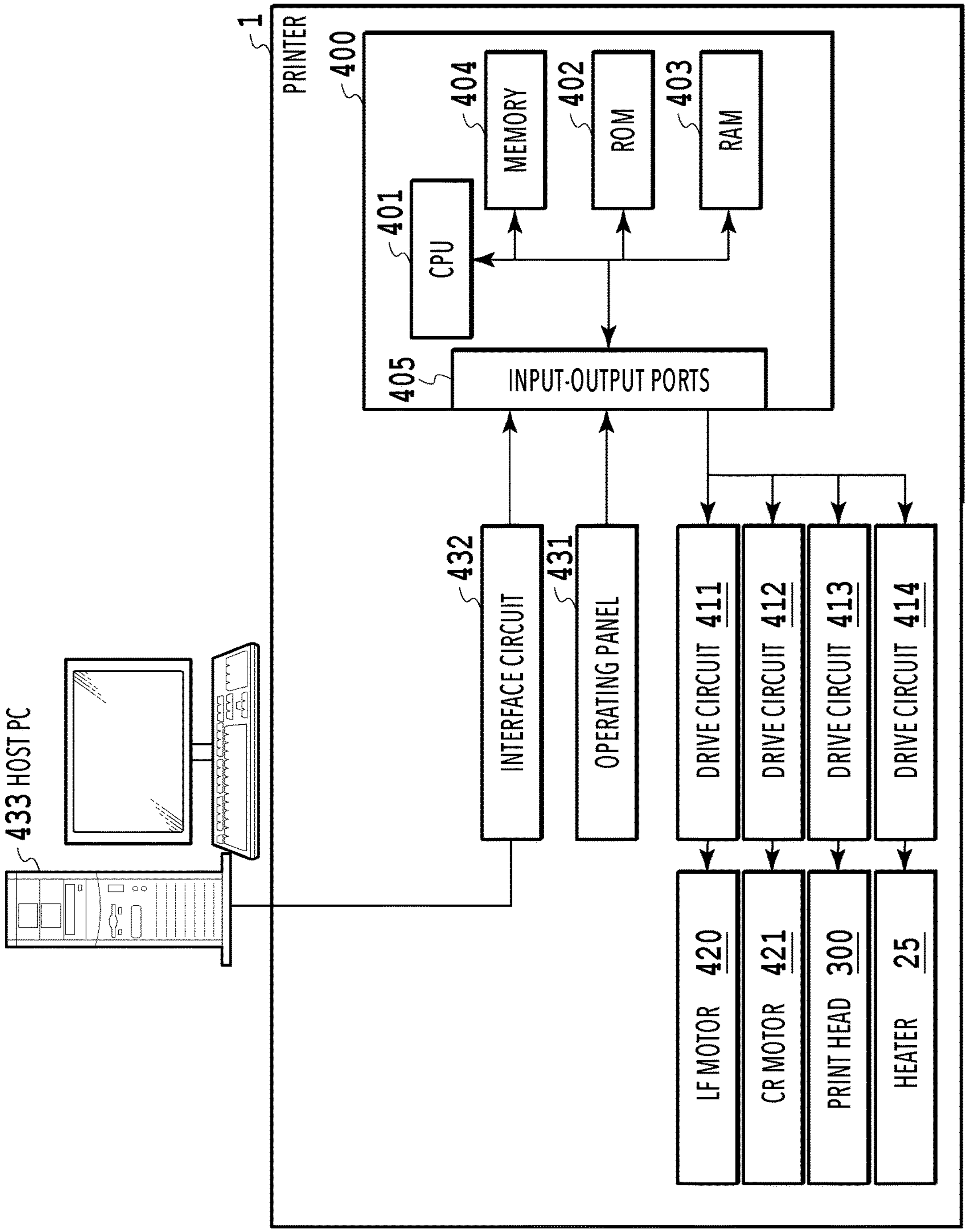
FIG. 4 is a block diagram illustrating the hardware configuration of the control system of the printing apparatus.

FIG. 4 is a block diagram illustrating a schematic configuration of a control system in the printing apparatus 1 of the present embodiment. A main control unit 400 includes a CPU 401, ROM 402, RAM 403, memory 404, and input-output ports 405.

The CPU 401 is a central processing unit that executes processing operation such as computation, selection, determination, and a control and recording operation. The ROM 402 is memory that stores a control program, and the like, executed by the CPU 401. The RAM 403 is a memory used for a buffer of recording data and the like. The memory 404 stores mask patterns, and the like. The input-output ports 405 are interface terminals used for input and output of data from and to the external apparatus. The input-output ports 405 are connected to drive circuits 411, 412, 413, and 414 for the conveyance motor (LF motor) 420, the carriage motor (CR motor) 421, the print head 300, and the heater 25. The input-output ports 405 are also connected to drive circuits for actuators, or the like, of a recovery processing unit described later, a maintenance mechanism (not illustrated), and a cutting unit. The main control unit 400 is connected to an operating panel 431 and an interface circuit 432 via the input-output ports 405. A host PC 433 is connected to the main control unit 400 via the interface circuit 432 and the input-output ports 405.

<Data Processing Process>

Figure 5:
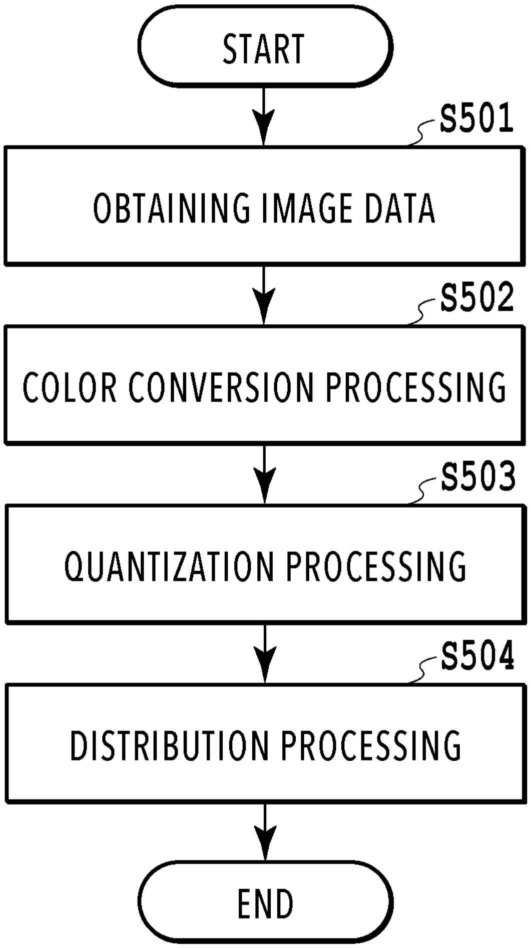
FIG. 5 is a flowchart illustrating a print-data generation process.

FIG. 5 is a flowchart of a print-data generation process executed by the CPU 401 according to the control program of the present embodiment.

In S501, the CPU 401 obtains image data (brightness data) represented by 8-bit value information (0 to 255) of each color, red (R), green (G), and blue (B), inputted from the host PC 433 to the printing apparatus 1. After the CPU 401 finishes obtaining the image data, the process proceeds to S502.

In S502, the CPU 401 converts the image data represented by R, G, and B into multivalued data represented by a plurality of kinds of the ink (K, C, M, and Y) used in printing. This color conversion processing generates multi-valued data represented by 8-bit value information (0 to 255) that defines the gradation of each ink at each pixel of the plurality of pixels. After the CPU 401 completes the color conversion processing, the process proceeds to S503.

In S503, the CPU 401 quantizes the multivalued data represented by K, C, M, and Y to generate quantized data (binary data) represented by 1-bit information (0, 1) that defines whether each color of the ink is to be ejected or not at each pixel. Here, the quantization processing can be performed according to various quantization methods such as an error diffusion method, a dithering method, and an index method. After the CPU 401 finishes the quantization processing, the process proceeds to S504.

In S504, the CPU 401 performs a distribution process to distribute the quantized data to a plurality of scanning operations for each unit area of the print head 300. This distribution process generates print data represented by 1-bit information (0, 1) that defines whether each color of the ink is to be ejected or not at each pixel in each of the scanning operations for each unit area of the print medium. This distribution process is performed by using a mask pattern that defines whether the ink is allowed to be ejected or not at each pixel in a plurality of scanning operations. The print head 300 ejects the ink according to the generated print data, and then the process procedure in the flowchart illustrated in FIG. 5 ends.

Note that the description is based on the configuration in which all the processing from S501 to S504 is executed by the CPU 401 in the printing apparatus 1. Alternatively, the processing may be performed in another configuration. For example, a configuration in which all the processing from S501 to S504 is executed by the host PC 433 is possible. As another possible configuration, for example, part of the processing from S501 to S504 may be executed by the host PC 433, and the remaining processing may be executed by the CPU 401 in the printing apparatus 1.

<Recovery Mechanism>

Figure 6:
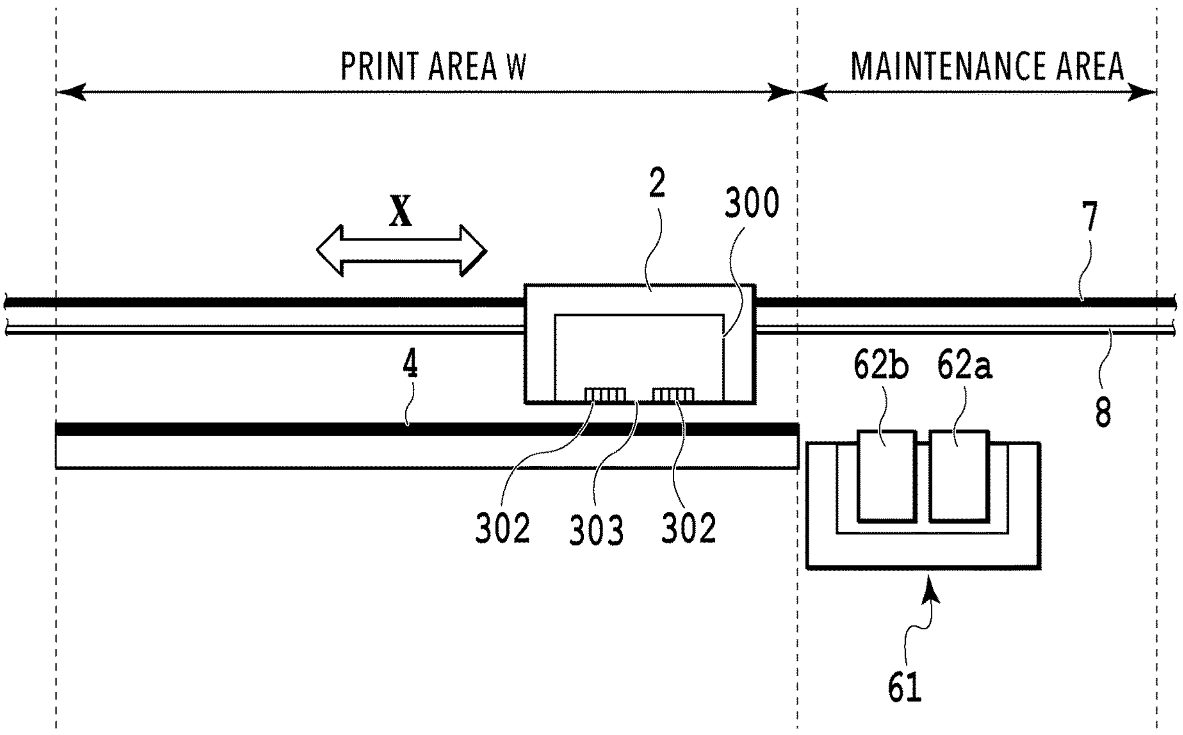
FIG. 6 is a diagram illustrating a recovery processing unit provided in the printing apparatus.

FIG. 6 is a diagram illustrating the recovery processing unit 61 provided in the printing apparatus 1 of the present embodiment. The recovery processing unit 61 is provided at a position facing the ejection orifice surface 303 of the print head 300 in a case wherein the carriage unit 2 supported by the guide shaft 8 moves to a maintenance area adjacent to a print area W according to signals from the linear encoder 7. The print area W is where the ejection orifices 304 of the print head 300 face the print medium P supported by the platen 4.

The recovery processing unit 61 will be described further in detail with reference to FIG. 7.

Figure 7:
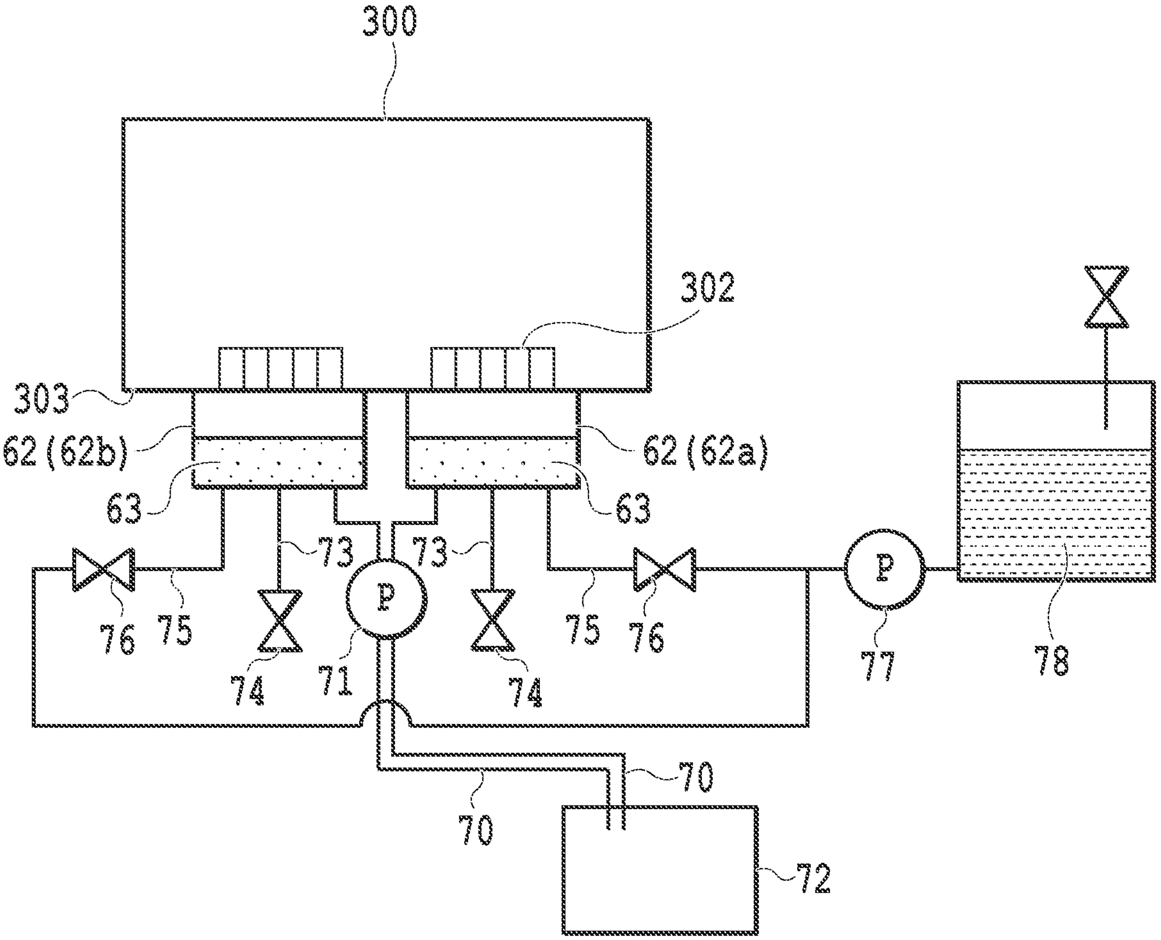
FIG. 7 is a cross-sectional side view of the configuration of the recovery processing unit provided in the printing apparatus.

FIG. 7 is a cross-sectional side view of the recovery processing unit 61 provided in the printing apparatus 1, illustrating its configuration. Caps 62 are provided with an elevation mechanism (not illustrated) for moving up and down the caps 62. In a case wherein the print head 300 is in the maintenance area, the elevation mechanism moves the caps 62 to a high position to bring the caps 62 into close contact with the ejection orifice surface 303 of the print head 300 and to cover the ejection orifice rows 302 with the caps 62. This operation and state is expressed as "capping".

Conversely, the operation and state in which the elevation mechanism moves the caps 62 to a lower position that is away from the ejection orifice surface 303 is expressed as "uncapping". FIG. 7 illustrates a capped state. The recovery processing unit 61 may have a plurality of caps 62 for one print head 300, and in the example of FIGS. 6 and 7, the recovery processing unit 61 has two caps 62*a* and 62*b*. The plurality of ejection orifice rows 302 are divided into two groups, and each group is covered with a different cap 62*a* or 62*b*.

<Suction Recovery and Preliminary Ejection>

In a case wherein the print head 300 contains a lot of air and is not sufficiently filled with the ink, in a case wherein a wrong type of the ink is mixed, or in a case where the ink contains foreign objects, the print head 300 cannot perform normal ink ejection and the image quality deteriorates in some cases. Hence, the caps 62 are connected to discharge paths 70 configured to discharge the liquid and air that entered the caps 62 and a discharge pump 71 connected to the discharge paths. The carriage unit 2 is moved to the maintenance area, the caps 62 are closed, and the discharge pump 71 is driven with atmospheric communication valves 74 closed. Driving the discharge pump 71 sucks the air and liquid in the caps 62 and generates a negative pressure in the caps 62. The negative pressure forcibly discharges the air, the ink, foreign objects, and the like, inside the print head 300 through the ejection orifices 304, which enables the print head 300 to perform favorable ejection. The air and liquid discharged by the suction pass though the discharge paths 70 and are stored in a waste liquid tank 72. This operation is referred to as "suction".

The caps 62 are connected to atmospheric communication paths 73 and atmospheric communication valves 74. In a state in which the caps 62 are closed, the atmospheric communication valves 74 makes the pressure in the closed spaces enclosed by the caps 62 and the ejection orifice surface 303 equal or close to the air pressure outside the caps. The pressure loss of air passing through the atmospheric communication valves 74 and the atmospheric communication paths 73 is designed to be less than the pressure loss of air passing through the ejection orifices 304 of the print head 300.

After the above suction operation, the ink discharged from the print head 300 is in the caps 62. Hence, the atmospheric communication valves 74 are opened, or the caps 62 are opened, and the discharge pump 71 is driven, so that discharge of the ink from the ejection orifices 304 stops, and the external air enters the caps 62. Thus, the ink that was in the caps 62 is discharged to the waste liquid tank 72.

In a case when one cap 62 is used for capping the ejection orifice rows 302 of different kinds of the ink, the suction causes a plurality of kinds of the ink to be mixed in the cap 62, and the ink can enter ejection orifices 304 in some cases. Hence, after a suction operation, the print head 300 ejects the ink into the caps 62 to discharge the mixed ink from the print head 300. Not only after such suction, the control in which the ejection orifice rows 302 is in a favorable state by ejecting the ink from the print head 300 is performed during various operations in usages other than ones for image printing. This ejection is referred to as "preliminary ejection". The sequence combining suction and preliminary ejection is referred to as "suction recovery", which is performed automatically or manually by the user of the printing apparatus 1 to improve the situation of ejection failure or to prevent ejection failure.

Preliminary ejection is performed at the optimum position depending on the operation being performed at the time. Hence, it is performed not only into the caps 62, but also onto the print medium P or the platen 4 in some cases.

Each cap 62 contains an in-cap absorbent 63. The in-cap absorbent 63 is made of a porous material and capable of storing the ink. In a case when preliminary ejection is executed into the caps 62, the distance between the ejection orifices 304 and the member facing the ejection orifices 304 is shorter in a case when the in-cap absorbent 63 is present than in a case when the in-cap absorbent 63 is not present, which decreases the amount of ejected the ink floating and scattering around. Thus, providing the in-cap absorbent 63 decreases contaminations in the printing apparatus 1.

<Supply and Discharge of Cleaning Liquid>

The caps 62 are connected to cleaning-liquid supply paths 75, cleaning-liquid supply valves 76, a cleaning-liquid supply pump 77, and a cleaning liquid tank 78. Driving the cleaning-liquid supply pump 77 with the cleaning-liquid supply valves 76 open causes the cleaning liquid to flow from the cleaning liquid tank 78 through the cleaning-liquid supply paths 75 into the caps 62. In a case when the recovery processing unit 61 has a plurality of caps 62, a cleaning-liquid supply path 75 and a cleaning-liquid supply valve 76 are provided for each cap, and opening/closing operation of each cleaning-liquid supply valve 76 enables cleaning liquid to be supplied to a desired cap 62. The cleaning liquid supplied into the caps 62 is discharged through the discharge paths 70 to the outside of the cap by driving the discharge pump 71.

Although the configuration of the present embodiment is capable of supplying and discharging cleaning liquid to and from the plurality of the caps simultaneously, the amount of the supplied cleaning liquid and the amount of discharged cleaning liquid described in the present embodiment refer to the amount per single cap. The cleaning liquid should preferably be an aqueous solution containing a solvent that redisperses the solidified ink. The solvent may contain a humectant, a surfactant, a pH stabilizer, a preservative, and the like.

<Evaporation of Ink>

The ink used in the present embodiment contains water, a coloring material (pigment), a resin, and a solvent. The ink in the print head 300 comes in contact with air at the ejection orifices 304, and in a case when the cap 62 is open, the ink ejected into the cap 62 comes in contact with air at the open face on the upper side of the cap 62. In a case when the water-vapor barrier property of the material forming the flow path, such as the discharge path 70, through which the ink flows in the printing apparatus 1 is low, water evaporates also from the flow path. Accordingly, in the ink condensed by water evaporation, the ratio of the coloring material, resin, and solvent that are constituents other than water increases relatively from the initial state. As the aggregation of solid content such as the coloring material and resin progresses, the viscosity of the ink increases (thickening), and the fluidity deteriorates.

In a case when the evaporation progresses further, adhesion may occur. In a case when the adhesion occurs in the discharge path 70, and the situation is serious, the adhering ink does not flow in the flow path, even if the discharge pump 71 is driven, and can block the discharge path 70 in some cases. In such a case, even if the discharge pump 71 is driven, the ink and air in the cap 62 cannot be discharged, and the suction recovery of the print head 300 cannot be made in some cases.

Figure 8:
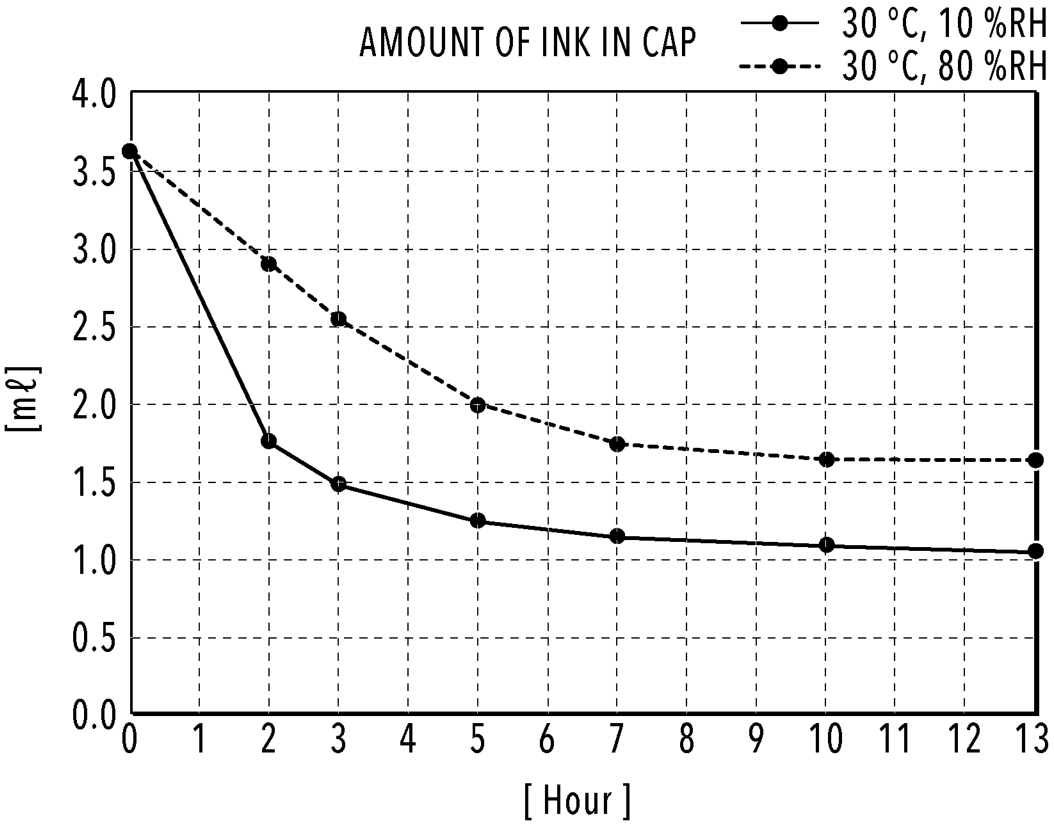
FIG. 8 is a graph showing changes over time in the amount of ink in a cap.

FIG. 8 illustrates the results of measuring the amount of the ink changed by evaporation in a state in which the cap 62 containing the ink is open during print operation. The cap used in the measurement has an internal space in the shape of a rectangular parallelepiped with a length of 60.0 mm, a width of 40.0 mm, and a depth of 4.0 mm, and the cap contains an in-cap absorbent 63 with a length of 60.0 mm, a width of 40.0 mm, and a height of 1.8 mm.

The amount of the ink initially put in the cap is 3.6 ml. Caps each having an in-cap absorbent 63 with the ink absorbed were placed in the following two temperature-humidity environments. The first temperature-humidity environment has (1) a temperature of 30° C. and a relative humidity of 10% RH, and the second temperature-humidity environment has (2) a temperature of 30° C. and a relative humidity of 80% RH. FIG. 8 is a graph created by measuring the amount of the ink of each cap at intervals of one to three hours and plotting the measured values. The horizontal axis represents the time elapsed from the start of the test, and the vertical axis represents the amount of the ink in the cap.

The measurement results in FIG. 8 show that the evaporation time largely differs depending on the temperature and humidity of the environment. Comparing the amount of the ink three hours after the start of the test, the evaporation residual ratio (indicating the ratio of the amount of remaining the ink to the amount of the ink in the beginning) of the ink placed in the 30° C. and 80% RH environment is 70%. The evaporation residual ratio of the ink placed in the 30° C. and 10% RH environment decreased to 40%. The results show that the time until thickening or adhesion of the ink occur largely differs depending on the temperature-humidity environment. Since the evaporation speed is largely dependent on the area of the surface in contact with air, the evaporation residual ratio differs in a case when the amount of the ink in the beginning differs or in a case when the area of the surface of the ink differs even if the amount of the ink and the environment are the same.

<Cleaning Sequence of Recovery Processing Unit>

With reference to FIG. 7 again, a description is given of a cleaning sequence (cleaning operation) of the recovery processing unit 61. Thickening or adhesion of the ink due to the ink evaporation tend to occur, especially, in the cap 62 and the discharge path 70 in the recovery processing unit 61. In a case of performing the suction recovery, a large amount of the ink flows into the cap 62 and the discharge path 70. Although the discharge pump 71 is driven with the cap 62 communicating with the atmosphere to discharge the ink during the suction recovery process, it is difficult to remove the ink attached to the cap 62 and the inner wall of the discharge path 70 without leaving any residue. Hence, after the suction recovery, some ink remains in the cap 62 and the discharge path 70. To dilute the remaining the ink and to prevent thickening or adhesion in the recovery processing unit 61, a cleaning sequence for the recovery processing unit 61 is performed. Simply, the cleaning sequence of the recovery processing unit 61 is a sequence combining supplying cleaning liquid and discharging cleaning liquid. In the cleaning sequence, a plurality of values are prepared for the amount of cleaning liquid to be supplied and the amount of cleaning liquid to be discharged, the number of iterations, and the like, so that different values can be used depending on the conditions in a case when the cleaning sequence of the recovery processing unit 61 is performed.

Figure 9:
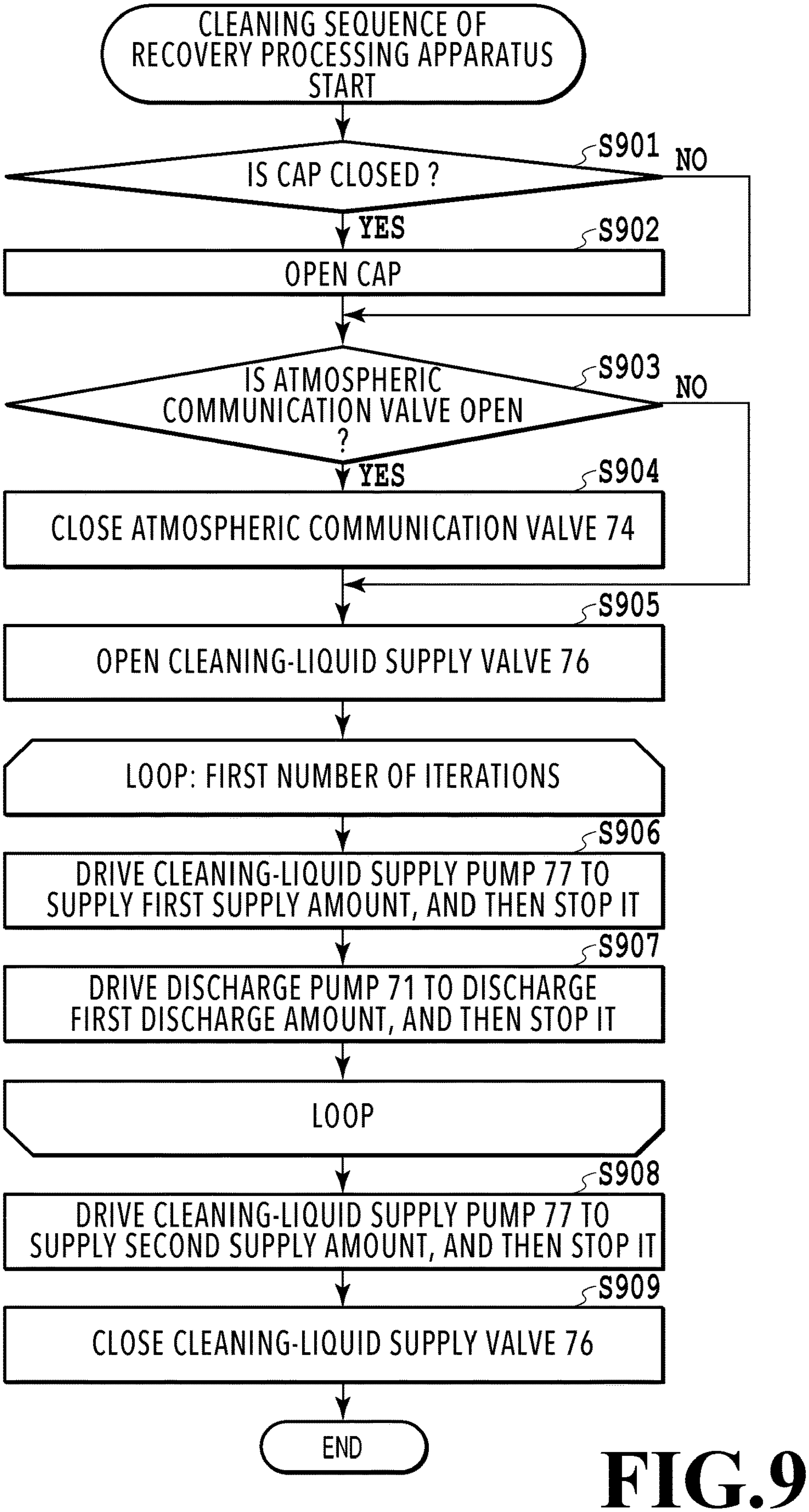
FIG. 9 is a flowchart illustrating a cleaning sequence of the recovery processing unit.

The cleaning sequence of the recovery processing unit 61 will be described further in detail with reference to FIG. 9. FIG. 9 is a flowchart illustrating the cleaning sequence of the recovery processing unit 61. In S901, the CPU 401 determines whether the cap 62 is open or closed. In a case when the cap 62 is open, the process proceeds to S903. In a case when the cap 62 is closed, the process proceeds to S902.

In S902, the cap 62 which was closed is opened, and the process proceeds to S903. In S903, the CPU 401 determines whether the atmospheric communication valve 74 connected to the cap 62 is open or closed. In a case when the atmospheric communication valve 74 is open, the process proceeds to S904. In a case when the atmospheric communication valve 74 is closed, the process proceeds to S905.

In S904, the atmospheric communication valve 74, which was open is closed, and the process proceeds to S905. In S905, the cleaning-liquid supply valve 76 is opened, and the process proceeds to S906. In S906, the cleaning liquid is supplied in a predetermined supply amount, and the process proceeds to S907. In S907, the cleaning liquid is discharged in a predetermined discharge amount. The processes in S906 and S907 are repeated a predetermined number of times, and then the process proceeds to S908.

Specific examples of S906 and S907 are described below. In a case when the suction recovery is performed, the parameters in the third set among the parameter sets shown in FIG. 10 are used for supply and discharge of the cleaning liquid. Note that selection of the parameter set will be described later.

Specifically, the cleaning-liquid supply pump 77 is driven, and 2.0 ml of the cleaning liquid is supplied. After that, the discharge pump 71 is driven, and 2.0 ml of the cleaning liquid is discharged. These operations of supplying and discharging the cleaning liquid are performed three times in total according to "the first number of iterations" in the third set. Note that, although the cleaning liquid is supplied in S906 and then the cleaning liquid is discharged in S907 sequentially in the present embodiment, these processes may be performed simultaneously.

In S908, the cleaning-liquid supply pump 77 is driven to supply the cleaning liquid. In this case, the amount of cleaning liquid to be supplied is determined according to the table in FIG. 11. An amount of the cleaning liquid specified in a second supply amount is supplied to the cap 62, and the process proceeds to S909.

The parameter A, B, or C shown in FIG. 11 is selected according to the latest temperature and humidity values detected by the temperature-humidity sensor S with reference to the table in FIG. 12. For example, in a case when the temperature and humidity at the time of execution of the cleaning sequence of the recovery processing unit 61 are 25° C. and 50% RH, the parameter A is selected. The table in FIG. 11 shows that in a case of parameter A, the second supply amount of cleaning liquid is 2.6 ml. This amount of cleaning liquid is supplied into the cap 62.

In S909, the cleaning-liquid supply valve 76 is closed, and the cleaning sequence in the flowchart illustrated in FIG. 9 ends. From the processing described above, in this cleaning sequence of the recovery processing unit, the total amount of cleaning liquid supplied to the cap 62 and the total amount of cleaning liquid discharged from the cap 62 are given by the following expressions.

The total supply amount: [first supply amount]×[first number of iterations]+[second supply amount]   Expression (1)

The total discharge amount: [first discharge amount]×[first number of iterations]   Expression (2)

For example, in a case when the third set in FIG. 10 and the parameter C in FIG. 11 are selected as the parameters of the cleaning sequence of the recovery processing unit 61, the total supply amount and the total discharge amount are given as follows.

The total supply amount: 2.0 ml×3 times+3.7 ml=9.7 ml

The total discharge amount: 2.0 ml×3 times=6.0 ml

Since the total discharge amount is less than the total supply amount, cleaning liquid remains in the cap 62 after the cleaning sequence of the recovery processing unit is executed.

Figure 13A:
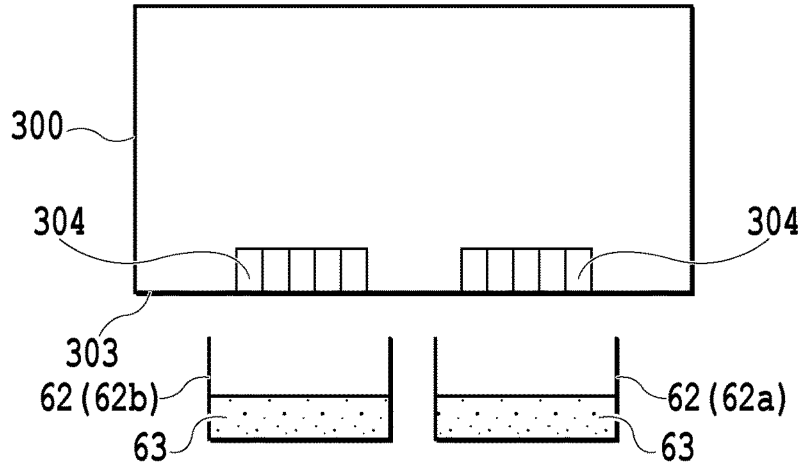
FIG. 13A is a cross-sectional side view of the print head and caps.
Figure 13B:
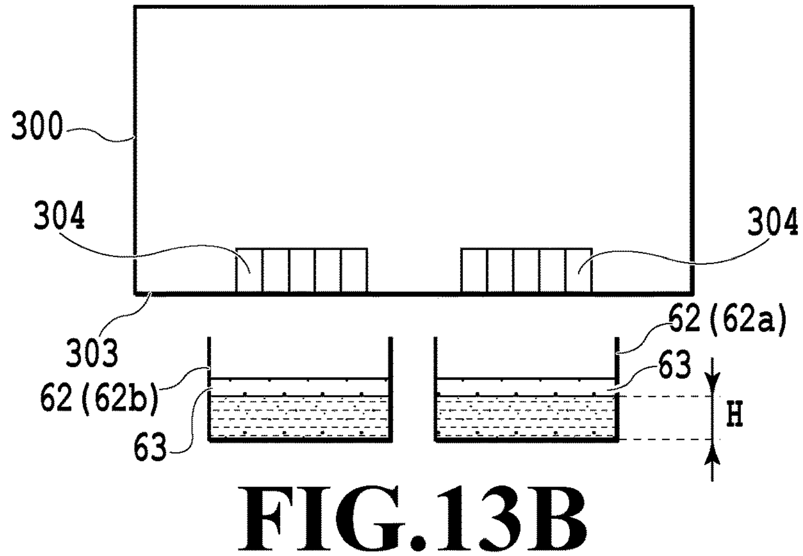
FIG. 13B is a cross-sectional side view of the print head and the caps.
Figure 13C:
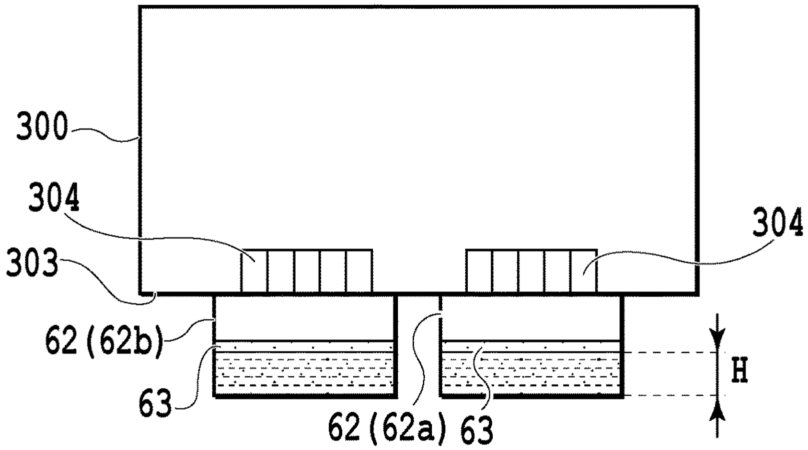
FIG. 13C is a cross-sectional side view of the print head and the caps.

The amount of cleaning liquid in the cap 62 will be described with reference to FIGS. 13A, 13B, and 13C. FIGS. 13A, 13B, and 13C are cross-sectional side views of the print head 300 and the caps 62. In FIG. 13A, the caps 62 are open, and the cleaning liquid is not present in the caps 62. FIG. 13B illustrates the print head 300 and the caps 62 in a state that the cleaning sequence of the recovery processing unit has been finished. In this state, the caps 62 are open, the cleaning liquid remains in the caps 62. The water level of the cleaning liquid in the caps 62 in this state is indicated by "H" in FIG. 13B.

As described above, in a case when the third set and the parameter C are selected as the parameters of the cleaning sequence of the recovery processing unit, the height of the liquid surface of cleaning liquid from the bottom surface of the cap is 1.6 mm. Since the depth of the cap 62 is 4.0 mm in the present embodiment, the amount of cleaning liquid is such an amount that the cleaning liquid does not overflow the cap 62. In addition, the liquid surface of cleaning liquid is within the in-cap absorbent 63.

In FIG. 13C, the caps 62 are closed from the state in FIG. 13B, and the amount of cleaning liquid in this closed state is such an amount that the cleaning liquid is not in contact with the ejection orifices 304 of the print head 300. The print operation and the like are executed in this state. The preliminary ejection is sometimes executed into the caps 62 during print operation, and, in that case, the preliminary ejection is performed into the caps 62 containing the cleaning liquid in this state.

<In-Cap Ink Count>

In a case when the preliminary ejection is executed into the caps 62 during the print operation and during a standby state in print operation, an ink count is performed to grasp the amount of the ink filled in the cap 62. Specifically, every time preliminary ejection is executed, the ink count is calculated with the following expression. The ink count value is accumulated, and the accumulated value is held. This accumulated value counted as above is referred to as "in-cap ink count".

In-cap ink count addition value=ejection amount (4.5 pl)×the number of ejection orifices×the number of ejection operations Expression (3)

For an unit having a plurality of the caps 62, this in-cap ink count is performed for each cap 62.

<Execution Timing of Cleaning Sequence of Recovery Processing Unit and Cleaning Timer>

Determination whether to execute the cleaning sequence of the recovery processing unit 61 is made, and, in a case when a condition is met, the cleaning sequence of the recovery processing unit 61 is executed. The cleaning sequence of the recovery processing unit 61 is executed at timings after the suction recovery is performed, in a case when the elapsed time measured by a cleaning timer exceeds a predetermined time (the cleaning timer expires), after the print operation is finished, and, in a case when the power of the printing apparatus is turned off.

The cleaning timer is configured to measure how much time has passed since the last cleaning of the recovery processing unit 61, and it is for preventing the ejection orifices 304 of the print head 300 from being left contaminated for long time. Details of the operation including the cleaning timer will be described with reference to the table in FIG. 14.

FIG. 14 is a table showing execution determination timings of the cleaning sequence of the recovery processing unit 61. The table includes the execution determination timing of the cleaning sequence of the recovery processing unit 61, the conditions of the in-cap ink count and other factors, the parameter set in the case each condition is met, and the update values of the in-cap ink count value and the cleaning timer after this processing is executed.

For example, after the suction recovery is executed, the cleaning sequence of the recovery processing unit 61 is always executed regardless of the in-cap ink count value as shown in the flowchart in FIG. 9. As the parameters for executing the cleaning sequence of the recovery processing unit 61, the third set is used. Details of the third set were explained in the description of FIG. 10. The value of the second supply amount is determined according to the temperature and the humidity at the time of execution of the cleaning sequence as described above.

After the cleaning sequence of the recovery processing unit is executed, the in-cap ink count value is reset to zero. The cleaning timer is also reset to zero, and the time elapsed from this point, starts to be measured. In the present embodiment, the set value of the cleaning timer is three hours. In a case where three hours have passed since the cleaning timer started (in a case when the cleaning timer expires), the CPU 401 determines whether to execute the cleaning sequence of the recovery processing unit 61.

In this case, details of the processing is determined in the condition written in the item "in a case when cleaning timer expires" in FIG. 14. The condition is judged in the descending order of the priority. In a case when a condition is met, the processing according to this condition is executed. In a case when a condition is not met, the CPU 401 determines whether the condition of the next priority is met.

For example, the case when the cleaning timer expires is taken as an example. A first predetermined value of the in-cap ink count is assumed to be 6.0E+8, and a second predetermined value is assumed to be 4.0E+8. Here, consider a case when the in-cap ink count at the time of expiration of the cleaning timer is 5.0E+8. This in-cap ink count is less than the first predetermined value, and, hence, the condition of the first priority is not satisfied.

Next, the CPU 401 determines whether this in-cap ink count meets the condition of the second priority. Here, since this in-cap ink count is greater than the second predetermined value, the condition of the second priority is met. According to the table in FIG. 14, the second set is specified as the parameter set, and thus, the second set specified in in FIG. 10 is used as the parameter set at the time of execution of the cleaning sequence of the recovery processing unit. Also, in this case, the parameter of the second supply amount is determined according to the temperature and the humidity with reference to FIGS. 11 and 12.

As described above, the second supply amount at the time of execution of the cleaning sequence of the recovery processing unit is not dependent on the parameter set that determines the first supply amount and the first discharge amount. As described above in the section of "Evaporation of Ink", the evaporation speed of cleaning liquid differs depending on temperature and humidity. In a case when the cleaning sequence of the recovery processing unit is finished, the amount of cleaning liquid remaining in the cap 62 differs depending on the supply amount selected from the parameter A, B, or C selected according to the temperature and humidity. This is because a necessary amount of the cleaning liquid needs to remain even if some of the cleaning liquid evaporates by the time the next cleaning sequence of the recovery processing unit is performed. In other words, in a case when a necessary amount of the cleaning liquid remains in the cap 62, adhesion components of the ink will not occur in the cap 62, and it is possible to prevent the ink from adhering to the flow path in a case when the ink is discharged from the cap 62.

Figure 15:
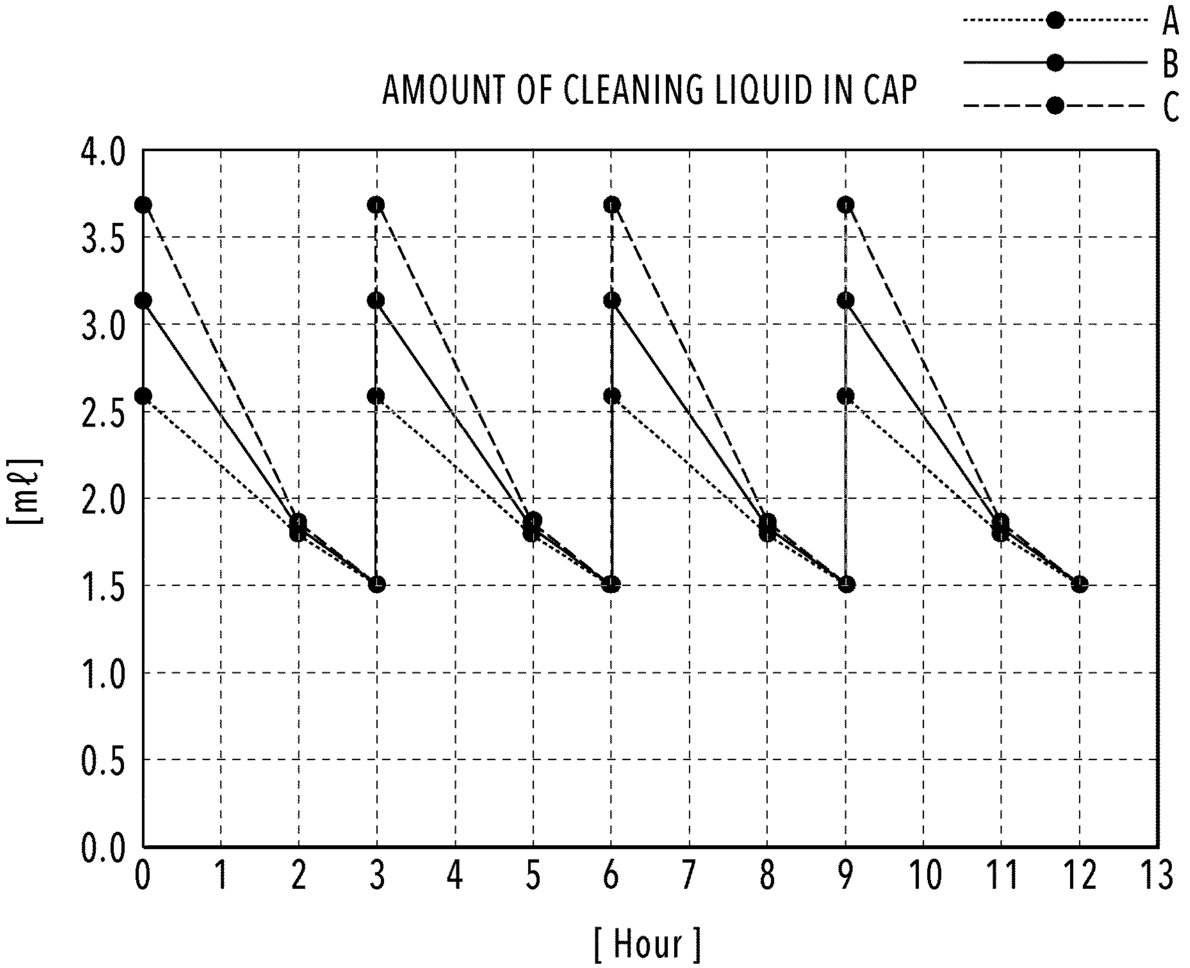
FIG. 15 is a graph showing changes over time in the amount of cleaning liquid in a cap.

FIG. 15 is a graph illustrating changes over time in the amount of the cleaning liquid in the cap 62. In FIG. 15, the horizontal axis represents the elapsed time, and the vertical axis represents the amount of cleaning liquid remaining in the cap 62. The first set is used as the parameter set. In the configuration of the present embodiment, the necessary amount of the above cleaning liquid is assumed to be 1.5 ml.

The elapsed time of zero [hours] indicates the time immediately after the cleaning sequence of the recovery processing unit is executed, and the amount of the cleaning liquid in the cap 62 is determined according to the temperature and the humidity with reference to FIGS. 11 and 12. The amount of the cleaning liquid in the environment of the parameter A is 2.6 ml, in the environment of the parameter B, 3.2 ml, and, in the environment of the parameter C, 3.7 ml. In the present embodiment, the cap 62 always needs to store a necessary amount (1.5 ml) or more of cleaning liquid. Although the evaporation speed of cleaning liquid differs in each environment, the configuration of the present embodiment enables a necessary amount of cleaning liquid to be maintained in a case where the cleaning timer expires as illustrated in FIG. 15.

In a case when the supply amount is the same in all environments, cleaning liquid more than necessary is consumed in environments in which the evaporation speed of the cleaning liquid is low. For example, consider a case when in both the environment of the parameter B and the environment of the parameter C, the second supply amount of the cleaning liquid is set to 3.7 ml, which is equal to the second supply amount of the cleaning liquid suppled in the environment of the parameter C of the present embodiment. In the present embodiment, in a case when the cleaning timer expires in the environment of the parameter C, the amount of cleaning liquid remaining in the cap 62 is 1.5 ml, and the second supply amount of cleaning liquid and the amount of cleaning liquid remaining in the cap 62 at the time of expiration of the cleaning timer are well balanced. In the cleaning sequence of the recovery processing unit, although 3.7 ml of the cleaning liquid, which is greater than the total discharge amount (2.0 ml), is supplied, this indicates that the total supply amount of the cleaning liquid is appropriate.

In other words, in the cleaning sequence of the recovery processing unit of the present embodiment, it is possible to reduce the consumption of the cleaning liquid by setting the total discharge amount of cleaning liquid less than the total supply amount of cleaning liquid. In addition, as illustrated in FIG. 15, after the cleaning sequence of the recovery processing unit of the present embodiment is completed, the water level of the cleaning liquid remaining in the cap 62 is kept at a water level that will not be in contact with the ejection orifices 304.

In a case when the second supply amount of the cleaning liquid in the environment of the parameter B is set to 3.7 ml, the total supply amount of cleaning liquid (3.7 ml) supplied in one cleaning sequence of the recovery processing unit is greater than the total supply amount (3.2 ml) in the present embodiment. Hence, at the time of expiration of the cleaning timer, the amount of the cleaning liquid remaining in the cap 62 is greater than the remaining amount (1.5 ml) in the present embodiment. Although execution of the cleaning sequence of the recovery processing unit discharges an amount of the cleaning liquid corresponding to the amount of the cleaning liquid remaining in the cap 62, 3.7 ml of cleaning liquid, which is greater than the total discharge amount, is newly supplied into the cap 62. In other words, the total supply amount of the cleaning liquid per unit time is greater than the total supply amount of the present embodiment, and accordingly, the amount of cleaning liquid consumed per unit time is greater. Hence, in the present embodiment, the total supply amount of cleaning liquid in the cleaning sequence of the recovery processing unit in the environment of the parameter B is reduced to be less than 3.7 ml so that the amount of cleaning liquid remaining in the cap 62 at the time of expiration of the cleaning timer will be appropriate. In the present embodiment, by setting the total supply amount of the cleaning liquid to an amount adapted to the environment, it is possible to further reduce the consumption of cleaning liquid.

A cleaning sequence in a case when a print operation is finished will be described with reference to FIG. 14. In this timing, the conditions including the humidity are judged. In a case when the condition column does not mention the humidity, the condition is judged only with the in-cap ink count.

For example, when the print operation is finished, in a case when the amount of the in-cap ink count is 5.0E+8, if the humidity is less than 20%, the condition of the second priority is satisfied. Thus, the cleaning sequence of the recovery processing unit is executed, and the first set is used as the parameter set. Regarding the in-cap ink count value, after this processing is executed, 1.0E+8 is reduced from the value before the processing is executed. Specifically, the value after the process is executed is calculated as (5.0E+8)−(1.0E+8)=4.0E+8. The in-cap ink count is updated to 4.0E+8, and, in a case when preliminary ejection is executed again, the value corresponding to the preliminary ejection is added to this updated value. The cleaning timer continues from the time before the processing.

When the print operation is finished, in a case when the in-cap the amount of the ink count is 5.0E+8, and the humidity is 50% RH, the condition of the third priority is met. In this case, the cleaning sequence of the recovery processing unit is not performed, and the in-cap ink count and the cleaning timer continue without the values of those being reset.

As described above, the processing of the cleaning sequence of the recovery processing unit is performed under the condition prepared for each execution determination timing. Even if the in-cap ink count value and the humidity are the same, details of processing may differ depending on the execution determination timing.

Regarding the parameter set, the cleaning power increases in the order of the first set, the second set, and the third set. Execution determination timing differs depending on the way of the print operation of the user using the printing apparatus. Whether the print operation is performed very often and how long one print operation continues also make differences. For example, in a case when a plurality of short-time print operations are performed in a row, the strong cleaning is not necessary for every print operation. Thickening or adhesion of the ink can be prevented by only performing cleaning one time for all the print operations. Hence, even in a case when the count value is the same, the cleaning strength is higher in a case when the cleaning timer expires than in a case where a print operation is finished.

In a case when the cleaning timer expires, the power is still on after that, and hence, the cleaning can be performed again after the next cleaning timer expires. However, in a case when the power is turned off, the cleaning can no longer be performed. Hence, in a case when a power-off command is issued, processing that prevents thickening or adhesion of the ink even if the printing apparatus 1 is left to stand for a long time after that is necessary.

As described above, the configuration in the present embodiment enables a reduction in the consumption of the cleaning liquid. Although the cleaning liquid is supplied through the cleaning-liquid supply paths 75 connected to the caps in the present embodiment, the present disclosure is not limited to this configuration. A configuration in which the cleaning liquid is ejected from some of the ejection orifice rows 302 of the print head 300 and a configuration in which cleaning liquid is supplied to the caps 62 from a separate mechanism are also applicable.

Regarding the in-cap ink count, only the ink ejected by preliminary ejection is counted in the present embodiment. The in-cap ink count may be executed not only in a case of preliminary ejection but also in cases when the ink is put in the cap in other ways such as a case when the inside of the print head 300 is pressurized to eject the ink through the ejection orifices 304.

Second Embodiment

In the first embodiment, the second supply amount which is a parameter of the cleaning sequence of the recovery processing unit illustrated in FIG. 9 is determined according to the temperature and the humidity. In addition, the set value at which the cleaning timer expires is three hours. This three hour is a fixed value. In the present embodiment, the second supply amount which is a parameter of the cleaning sequence of the recovery processing unit illustrated in FIG. 9 is set to 3.7 ml independently of the temperature and the humidity of the environment.

The set value at which the cleaning timer expires is determined in a variable manner as illustrated in FIG. 16B depending on the temperature and the humidity of the environment in a case when the preceding cleaning timer is reset. As illustrated in FIG. 16A, the parameter A, parameter B, or parameter C is selected according to the temperature and humidity of the environment. The timers are set for the parameters A, B, and C at 6.0 hours, 4.5 hours, and 3.0 hours, respectively.

Figure 17:
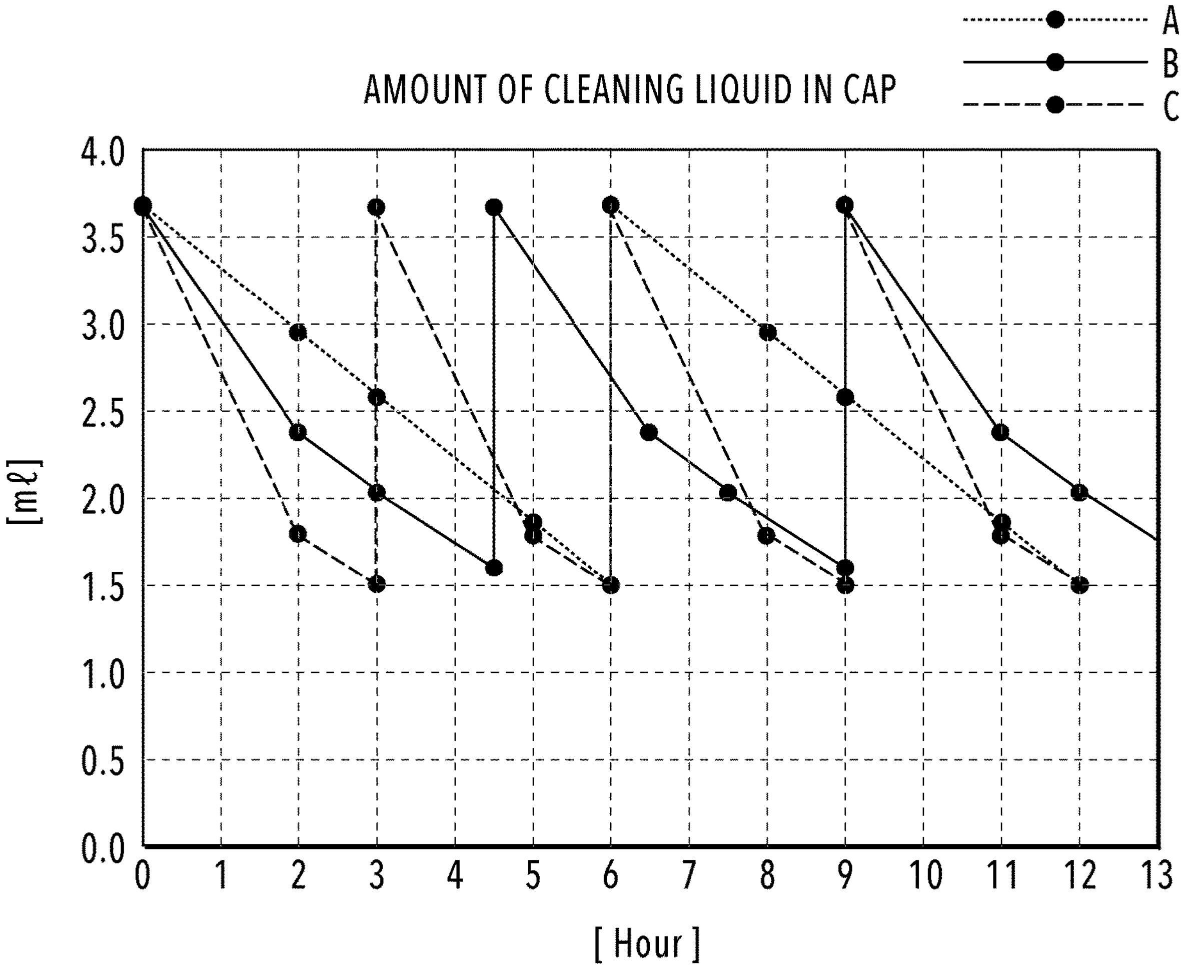
FIG. 17 is a graph showing changes over time in the amount of cleaning liquid in a cap.

FIG. 17 shows changes over time in the amount of cleaning liquid in the cap 62 in a case when the second supply amount and the cleaning timer are set to the values described above. In FIG. 17, the horizontal axis represents the elapsed time, and the vertical axis represents the amount of cleaning liquid in the cap 62.

The elapsed time of zero [hours] indicates the time immediately after the cleaning sequence of the recovery processing unit 61 is executed. At this point, the amount of cleaning liquid in the cap 62 is 3.7 ml in any environment. According to the temperature and humidity at this point, the time when the execution determination is made for the cleaning sequence of the recovery processing unit by the next cleaning timer is determined.

As the time passes, the evaporation speed in each environment is different. The necessary cleaning liquid amount 1.5 ml is kept until the next cleaning timing in any environment. In a case when the suction recovery process is set in or a power off command is issued before the cleaning timer expires, although cleaning timings change, the cleaning timings are set earlier. Hence, the necessary cleaning liquid amount of 1.5 ml is kept in the cap 62.

Third Embodiment

In the third embodiment, regarding the cleaning timer used in the first embodiment and the second embodiment, the time elapsed from the start of the timer is weighted depending on whether the cap 62 is open or closed. In a case when the cap 62 is open, the elapsed time is accumulated by using actual elapsed time (weighting factor=1). In a case when the cap 62 is closed, the elapsed time is accumulated with the weighting factor set to 0.5 because the evaporation speed of cleaning liquid is slow.

For example, in a case when the cap 62 is open for 1 hour, and the cap is closed for one hour, the time used for the cleaning timer is 1.5 hours. Depending on the materials, structures, and length of the cap 62 and the discharge path 70, the degree of sealing between the ejection orifice surface 303 and the cap 62 and the water-vapor barrier property indicating the degree of passing the water vapor through the material, largely differ. Hence, the weighting factor is determined in consideration of the materials, structures, and the length of the cap 62 and the discharge path 70.

OTHER EMBODIMENTS

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:

a cap configured to cap a print head having an ejection orifice from which ink is ejected;

a supply unit configured to supply cleaning liquid into the cap;

a discharge unit configured to discharge the cleaning liquid from the cap; and a control unit configured to execute a discharge operation to cause the discharge unit to discharge an amount of the cleaning liquid less than a supply amount of the cleaning liquid supplied into the cap by the supply unit, wherein, in a case when an ink amount discharged from the ejection orifice is a first amount, the control unit does not execute the discharge operation, and wherein, in a case when the ink amount discharged from the ejection orifice is a second amount that is greater than the first amount, the control unit executes the discharge operation.

2. The printing apparatus according to claim 1, wherein a liquid surface of the cleaning liquid remaining in the cap after the discharge operation has been completed is positioned away from the ejection orifice.

3. The printing apparatus according to claim 1, wherein, in a case of executing the discharge operation, the control unit causes the supply unit to supply the cleaning liquid into the cap and causes the discharge unit to discharge the cleaning liquid from the cap with the cap positioned away from the print head.

4. The printing apparatus according to claim 1, wherein, during a print operation, the cap is positioned away from the print head, and a liquid surface in the cap is maintained at a height away from the ejection orifice.

5. The printing apparatus according to claim 1, wherein the print head ejects the liquid from the ejection orifice into the cap.

6. The printing apparatus according to claim 1, wherein, in a case when the liquid amount is the first amount, the supply amount of the cleaning liquid is less than that in a case when the liquid amount is the second amount.

7. The printing apparatus according to claim 1, further comprising a timer configured to measure the time elapsed from the preceding one of the discharge operation, wherein the discharge operation is executed in at least one of a case when the elapsed time exceeds a predetermined time, a case when a print operation by the print head is finished, and a case when the power of the printing apparatus is turned off.

8. The printing apparatus according to claim 7, wherein, in a case when the discharge operation has been completed, the control unit resets the timer.

9. The printing apparatus according to claim 7, further comprising a temperature measurement unit configured to measure the temperature around the printing apparatus, wherein, in a case when the temperature is a first temperature, the predetermined time is set shorter than that in a case when the temperature is a second temperature higher than the first temperature.

10. The printing apparatus according to claim 7, further comprising a humidity measurement unit configured to measure the humidity around the printing apparatus, wherein, in a case when the humidity is a first humidity, the predetermined time is set shorter than in a case when the humidity is a second humidity higher the first humidity.

11. The printing apparatus according to claim 1, further comprising a suction unit configured to perform a suction operation for sucking liquid from the print head, wherein the discharge operation is performed after the suction operation is executed.

12. The printing apparatus according to claim 1, wherein, in a case when the print head is capped with the cap, the execution timing of the discharge operation is set later than in a case when the print head is not capped with the cap.

13. The printing apparatus according to claim 1, further comprising a temperature measurement unit configured to measure the temperature around the printing apparatus, wherein, after the discharge operation, in a case when the temperature is a first temperature, the control unit causes the supply unit to supply the cleaning liquid in a first amount, and, in a case when the temperature is a second temperature higher than the first temperature, the control unit causes the supply unit to supply the cleaning liquid in a second amount greater than the first amount.

14. The printing apparatus according to claim 1, further comprising a humidity measurement unit configured to measure the humidity around the printing apparatus, wherein, after the discharge operation, in a case when the humidity is a first humidity, the control unit causes the supply unit to supply the cleaning liquid in a first amount, and, in a case when the humidity is a second humidity higher than the first humidity, the control unit causes the supply unit to supply the cleaning liquid in a second amount less than the first amount.

15. A method of controlling a printing apparatus, the printing apparatus including a cap configured to cap a print head having an ejection orifice from which ink is ejected, the method comprising:

supplying cleaning liquid into the cap;

discharging the cleaning liquid from the cap; and executing a discharge operation to discharge, in the discharging, an amount of the cleaning liquid less than a supply amount of the cleaning liquid supplied into the cap in the supplying, wherein, in a case when an ink amount discharged from the ejection orifice is a first amount, the discharge operation is not executed, and wherein, in a case when the ink amount discharged from the ejection orifice is a second amount that is greater than the first amount, the discharge operation is executed.

16. A non-transitory computer readable storage medium storing a program for causing a computer to perform a method of controlling a printing apparatus, the printing apparatus including a cap configured to cap a print head having an ejection orifice from which ink is ejected, the control comprising:

supplying cleaning liquid into the cap;

discharging the cleaning liquid from the cap; and executing a discharge operation to discharge, in the discharging, an amount of the cleaning liquid less than a supply amount of the cleaning liquid supplied into the cap in the supplying, wherein, in a case when an ink amount discharged from the ejection orifice is a first amount, the discharge operation is not executed, and wherein, in a case when the ink amount discharged from the ejection orifice is a second amount that is greater than the first amount, the discharge operation is executed.

* * * * *